United States Patent [19]

Jebens

[11] Patent Number: 4,488,280
[45] Date of Patent: Dec. 11, 1984

[54] VIDEO DISC PLAYER HAVING IMPROVED CADDY EXTRACTION MECHANISM

[75] Inventor: Robert W. Jebens, Skillman, N.J.

[73] Assignee: RCA Corporation, New York, N.Y.

[21] Appl. No.: 536,087

[22] Filed: Sep. 27, 1983

[51] Int. Cl.³ .............................................. G11B 25/04
[52] U.S. Cl. .................................... 369/77.2; 360/133
[58] Field of Search .......................... 360/133; 206/309; 369/77.2

[56] References Cited

U.S. PATENT DOCUMENTS 4,226,424 10/1980 Gordon .............................. 369/77.2

FOREIGN PATENT DOCUMENTS 2102189  6/1982  Japan ................................. 369/77.2
2098380A  5/1982  United Kingdom .

OTHER PUBLICATIONS

U.S. patent application of Thomas Francis Kirschner, entitled—"Video Disc Player Having Caddy Overtravel Mechanism", Ser. No. 536,091, filed Sep. 27, 1983.

Primary Examiner—Charles E. Frankfort
Assistant Examiner—Thomas Matecki
Attorney, Agent, or Firm—Eugene M. Whitacre; William H. Meise; Dilip A. Kulkarni

[57] ABSTRACT

The player is provided with a pair of spaced apart spine latching members which hook up with an inner record retaining spine as a disc record caddy is inserted into the player so that when the outer sleeve is withdrawn, the record/spine assembly is retained inside the player. A selected one of the spine latching members is equipped with a moveably mounted overtravel member which precludes the selected latching member from capturing the spine until the other latching member is also in position to latch up the spine. A connecting member rigidly intercoupling the latching members precludes the other latching member from capturing the spine until both latching members are ready to latch up the spine to ensure simultaneous latching of the spine.

8 Claims, 12 Drawing Figures

VIDEO DISC PLAYER HAVING IMPROVED CADDY EXTRACTION MECHANISM

This invention relates to a record playback system, and more particularly, it relates to a mechanism for loading a record into a record player and removing it therefrom while the record remains enclosed in its caddy.

In certain systems, picture and sound signals are stored on a disc record in the form of physical undulations in a continuous spiral track disposed on the record surface. The variations in electrical capacitance between an electrode disposed on a record-engaging stylus and a conductive property of a turntable-supported record are sensed as the physical undulations on the record surface pass beneath the stylus tip. The capacitive variations are converted into electrical signals suitable for application to a conventional television receiver.

It is beneficial to enclose a video record in a caddy which comprises an inner record retaining spine removably located within an outer jacket or sleeve. The record retaining spine has an opening in which a record is received to form a record/spine assembly. The record retaining spine is provided with a pair of spaced apart locking fingers disposed at the opposite edges thereof to releasably secure the spine to the sleeve. For record loading, a full caddy is inserted into an input slot provided in the player along a path defined by a pair of caddy guide rails. A record extraction mechanism disposed in the player removes the record/spine assembly from the sleeve when the sleeve is withdrawn to leave the assembly inside the player resting on a set of record receiving pads. The retained record is then transferred to the turntable for playback. For record retrieval, the record is transferred back to the receiving pads, and an empty jacket is reinserted into the player to recapture the record/spine, assembly. U.S. Pat. Nos. 4,239,108 and 4,226,424, respectively, illustrate a video disc caddy and a record extraction mechanism suitable for use therewith.

The record extraction mechanism in U.S. Pat. No. 4,226,424 comprises a pair of pivotally-mounted spaced apart pry bars which protrude into the sleeve and deflect the spine locking fingers to release the spine from the sleeve as a caddy is inserted into the player. Simultaneously, a pair of pivotally-mounted spaced apart hooks enter into the respective slots provided in the spine to lock it to the player, so that when the sleeve is removed, the record/spine assembly is held inside the player. A pair of springs bias the spine latching hooks into latching engagement with the spine. A second pair of springs connect the pry bars and the spine latching hooks together to cause the pry bars to follow the deflected hooks when the sleeve is withdrawn. When an empty sleeve is reinserted into the player to recapture the record/spine assembly, it drives the displaced pry bars against the spine latching hooks to force them away from the spine to free the caddy. The caddy is then extracted from the player.

Both the pry bars and the spine latching hooks are desirably mounted on a single cross shaft located at the back end of the player. When a caddy is inserted into the player, the spine is released from its sleeve by the pry bars and secured to the player by the spine latching hooks, so that the record/spine assembly is maintained inside the player when the sleeve is extracted. The springs connecting the pry bars and the spine latching hooks together cause the pry bars to drop down as the sleeve is withdrawn. An empty sleeve, reinserted into the player to retrieve the record/spine assembly, forces the depressed pry bars against the spine latching hooks to cause the spine latching hooks to drop down to release the caddy. The caddy is then removed.

In a record extraction mechanism of the above type, a failure mode exists. It is possible that only one side of the spine may latch up if the caddy is not sufficiently driven in or is cocked when inserted, thereby leaving a misaligned record/spine assembly in the player upon jacket withdrawal. The misaligned record/spine assembly has the potential of causing damage to the disc and the player components during the transfer of the record to the turntable.

In accordance with this invention, a moveably mounted latch overtravel member is provided in the caddy insertion path for cooperation with one of the spine latching hooks. The leading edge of the caddy engages the moveably mounted member and drives it back therewith. When so driven, the moveably mounted member precludes the associated spine latching hook from capturing the spine until the other spine latching hook is ready to engage the spine. A member rigidly coupling the two spine latching hooks prevents the other spine latching hook from engaging the spine until both hooks are in position to latch up the spine to the player.

Pursuant to a further aspect of the invention, the latch overtravel member is mounted on a selected one of the spine latching hooks. According to another aspect of the invention, the latch overtravel member is slidably mounted in respect of the selected latching hook. In accordance with a still further feature of the invention, the latch overtravel member is pivotally mounted on the selected latching hook.

In the drawings:

FIG. 2a illustrates a sideview of the cutouts in the spine of FIG. 2;

Figure 1:
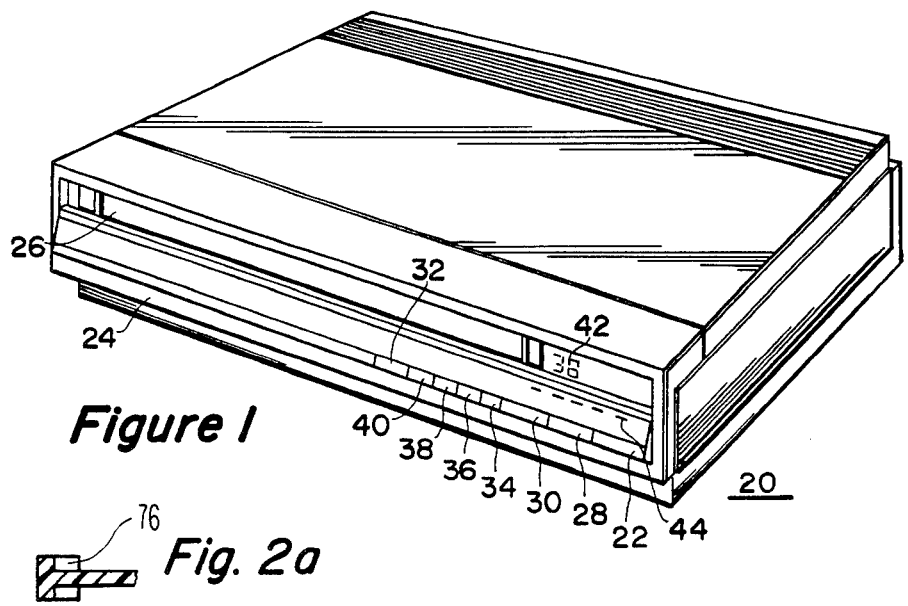
FIG. 1 shows a video disc player having a caddy extraction mechanism.
Figure 3:
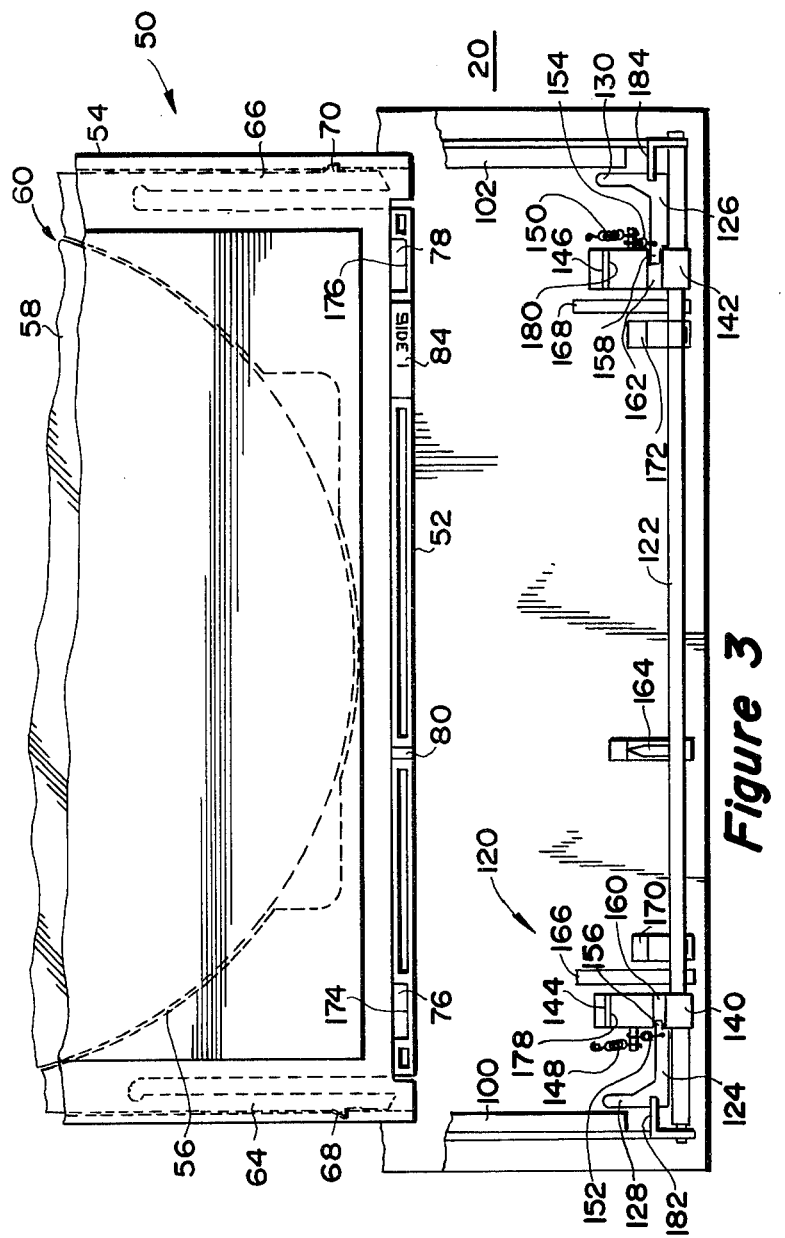
Figure 4:
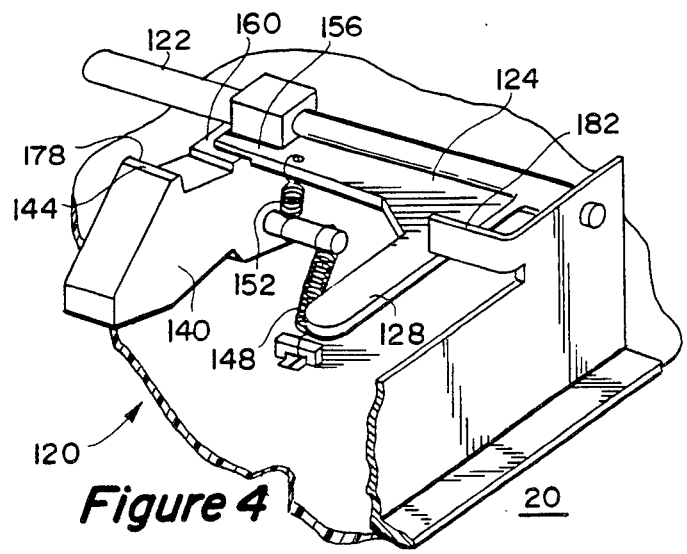
Figure 5:
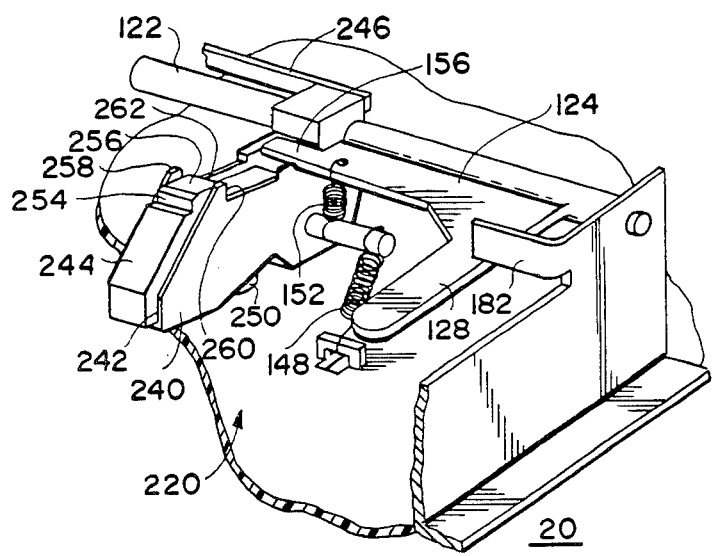
Figures 10, 11:
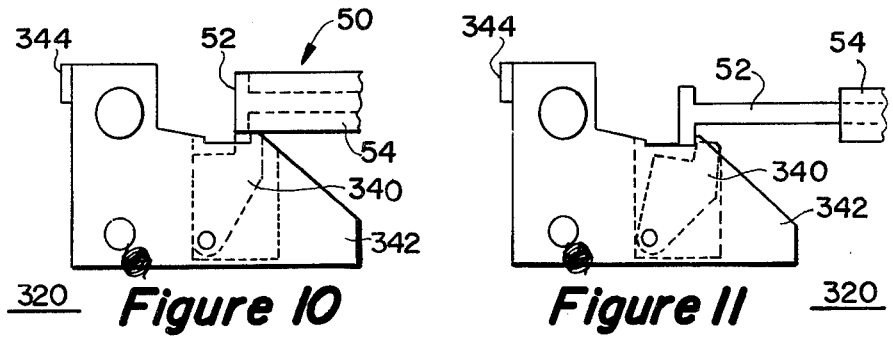

FIGS. 3 and 4 respectively depict a partial plan view and a perspective view of the caddy extraction mechanism used in the FIG. 1 video disc player;

FIG. 5 portrays a modification to the record extraction mechanism of FIGS. 3 and 4 in accordance with this invention;

FIGS. 6–9 indicate the operation of the modified caddy extraction mechanism; and FIGS. 10 and 11 represent another embodiment of the caddy extraction mechanism pursuant to the principles of the present invention.

Figure 2:
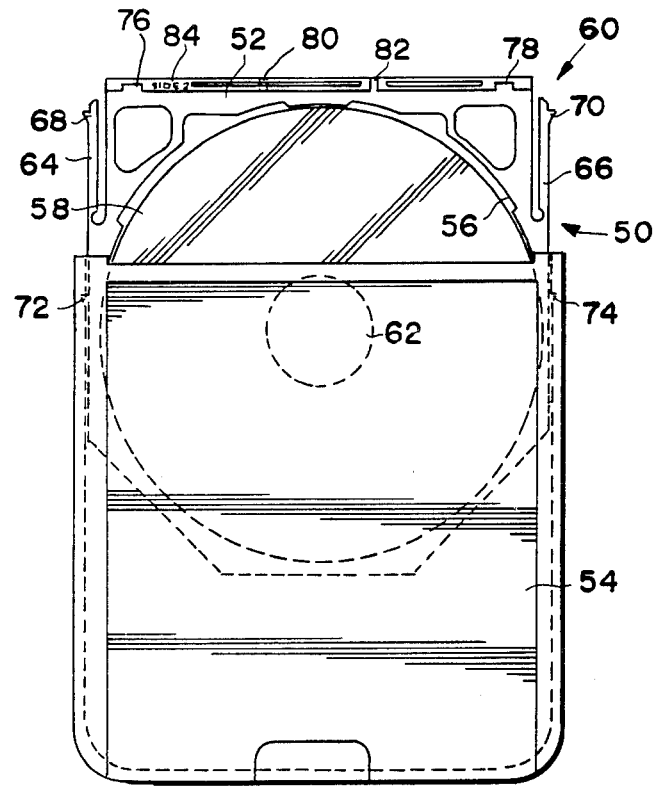
FIG. 2 illustrates a video disc caddy suitable for use with the video disc player of FIG. 1.

Shown in FIG. 1 is a video disc player 20. To play a disc, the player is turned on by pressing the "POWER" button 22 located on the front panel 24. A loaded record caddy, illustrated in FIG. 2, is inserted into the player through a caddy input slot 26, and the caddy sleeve is then extracted leaving the enclosed record/spine assembly inside the player. The record is automatically deposited on the turntable, and played back through a conventional television receiver. At any point during playback, the viewer can reject the remainder of the record by depressing the "REJECT" button 28, or interrupt the program by activating the "PLAY/PAUSE" button 30. The player has a "CHANNEL SELECT" button 32 to select any one of two audio channels in the event of a bilingual program disc. Buttons 34, 36, 38 and 40 permit the user to visually search the record in either direction at two different speeds (e.g., 16 and 120 times the normal playback speed). An LED indicator 42 shows the elapsed playing time. Various player functions—such as SIDE 1-2, CHANNEL A-B, STEREO—are indicated by a plurality of light indicators 44.

The FIG. 2 caddy 50 consists of a planar record retaining spine 52 removably enclosed in a flat outer sleeve 54. The retaining spine 52 has an opening 56 in which a centrally-apertured record 58 is received forming a record/spine assembly 60. Integrally molded with the spine 52 are spine locking fingers 64 and 66 for releasably securing the spine 52 in its sleeve 54. The spine locking fingers 64 and 66 are fitted with protruding elements 68 and 70 which are received in the respective recesses 72 and 74 provided in the sleeve 54 to hold the spine 52 in place. The spine 52 has cutouts 76 and 78 in which the respective spine latching members of the player record extraction mechanism are selectively received to secure the spine to the player. The front edge of the spine 52 has slots 80 and 82 in which a side-to-side locating member of the player is received upon caddy insertion to accurately locate the record/spine assembly 60 in the player. The spine 52 is further provided with record side identifying indicia 84.

To load a record, the caddy 50 is manually inserted into the player through the input slot 26. The player has a set of guide rails 100 and 102, depicted in FIG. 3, for guiding the caddy insertion along a path. The player is further provided with a record extraction mechanism 120, shown in FIGS. 3 and 4, to extract the enclosed record/spine assembly from the caddy for retention in the player and to return the retained assembly back to the caddy after playback without the need for touching the record. The record extraction mechanism 120 comprises a cross shaft 122 pivotally mounted near the back end of the player at right angles to the caddy insertion path. Disposed at the opposite ends of the offset shaft 122, and fixedly secured thereto, are a pair of spine releasing members 124 and 126. The spine releasing members 124 and 126 are each equipped with respective wedge-like portions 128 and 130 arranged in the caddy insertion path. When the caddy 50 is inserted into the player, the wedge-like portions 128 and 130 protrude into the sleeve 54 to deflect the spine locking fingers 64 and 66 to release the spine 52 from the sleeve.

The record extraction mechanism 120 further includes a pair of spine latching members 140 and 142 mounted freely on the cross shaft 122 adjacent to the respective spine releasing members 124 and 126. When the caddy 50 is inserted into the player, it depresses the hook-like portions 144 and 146 of the spine latching members 140 and 142, which are also disposed in the caddy insertion path. A pair of coil springs 148 and 150 drive the hook-like portions 144 and 146 into the slots 76 and 78 in the spine 52 to lock the spine to the player. The sleeve 54 is then manually extracted, leaving the record/spine assembly 60 inside the player resting on a set of record receiving pads (not shown). When the sleeve 54 is withdrawn, a pair of springs 152 and 154, connecting the spine releasing members 124 and 126 and the spine latching members 140 and 142 together, cause the spine releasing members to follow the spine latching members until the tabs 156 and 158 disposed on the spine releasing members reengage the respective walls 160 and 162 of the spine latching members.

A side-to-side locating member 164 is driven into the slot 80 disposed in the spine 52 as the caddy 50 arrives at its fully inserted position in the player to assure accurate lateral registration of the spine in the player. The player is further fitted with a pair of slotted brackets 166 and 168 which serve to ensure accurate vertical alignment of the spine 52. Disposed in the player are a pair of stiff leaf springs 170 and 172 which bias the spine 52 so that the perpendicularly disposed walls 174 and 176 of the respective cutouts 74 and 76 in the spine are firmly in engagement with the perpendicularly disposed edges 178 and 180 of the corresponding hook-like portions 144 and 146 of the spine latching members 140 and 142 to provide accurate front-to-back alignment of the spine.

A record handling mechanism (not illustrated) is activated to transfer the retained record 58 from the receiving pads to a turntable, and the turntable motor is turned on. A stylus arm carriage is driven by a motor to a position over the turntable, and the stylus is lowered onto the record 58. During playback, the carriage motor drives the carriage to follow the pickup stylus. At the end of the playback, the carriage motor returns the carriage to its starting position. The record 58 is then returned to the receiving pads by the record handling mechanism to redefine the record/spine assembly 60.

To recapture the record/spine assembly 60 disposed on the receiving pads, the empty sleeve 54 is reinserted into the player. As the caddy sleeve 54 reaches the fully inserted position in the player, its front edge engages and further depresses the wedge-like portions 128 and 130 of the displaced spine releasing members 124 and 126. When the spine releasing members 124 and 126 are depressed by the sleeve 54, the tabs 156 and 158, in turn, press against the respective spine latching members 140 and 142 to push the hook-like portions 144 and 146 out of the slots 76 and 78 in the spine 52 to release the spine. When the spine 52 is thus released, the stiff leaf springs 170 and 172 force the spine into the jacket 54 to cause the spine locking fingers 64 and 66 to secure the spine to the jacket. The caddy 50 is then manually removed from the player. The springs 148 and 150 rotate the spine latching members 140 and 142 and, in turn, the spine releasing members 124 and 126 upward until they are against the respective stops 182 and 184 provided in the player housing, thereby resetting the caddy extraction mechanism for the next cycle.

As previously indicated, it is possible to hook up one side of the spine 52 if the caddy 50 is insufficiently inserted into the player or if the caddy is cocked as it is pushed into the player. This problem results in a mislocated record/spine assembly 60, which can cause damage, for example, to the stylus or the disc during record transfer operation. To this end, the record extraction mechanism 120 is modified in accordance with the principles of the present invention to ensure that both sides of the spine 52 latch up in the player simultaneously.

In the modified record extraction mechanism 220, a selected one of the spine latching members—240 is provided with a slot 242 in which an overtravel member 244 is slidably received. The two spine latching members 142 and 240 are connected to each other by a rigid coupling member 246. The construction and operation of the modified record extraction mechanism 220 will now be described in conjunction with FIGS. 6–9.

Figures 6, 7:
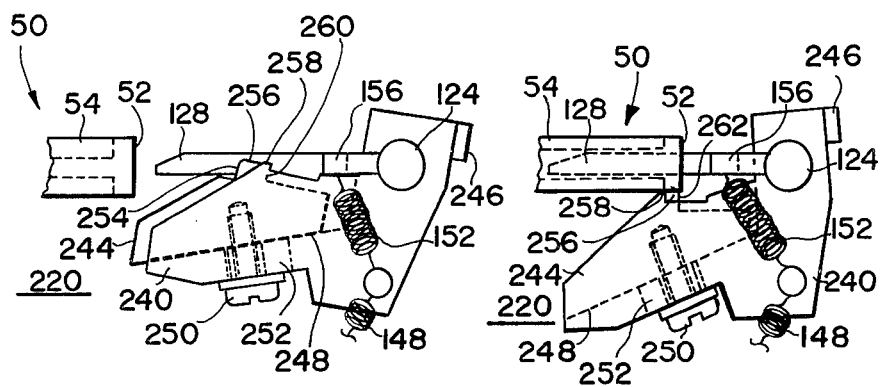

As indicated in FIGS. 6 and 7, when the caddy 50 is inserted into the player, the spine releasing members 124 and 126 enter the jacket 54 to defeat the integrally-molded spine locking fingers 64 and 66 to free the spine 52 as indicated in FIGS. 6 and 7. As the caddy 50 is driven in, the leading edge thereof engages the slidably-mounted overtravel member 244 and pushes it back along the ramp 248 defined by the bottom surface of the slot 242 in the spine latching member 240. A retaining pin 250, threaded through an elongated opening 252 in the spine latching member 240, serves to hold the overtravel member 244 within the slot 242. The overtravel member 244 is provided with a notch 254 in the caddy insertion path, so that caddy 50 captures the overtravel member and positively advances it to the position shown in FIG. 7. The overtravel member 244 has a spine engaging portion 256 that is disposed below the spine engaging portion 258 of the spine latching member 240 when the overtravel member is retracted as can be seen in FIGS. 5 and 6. When the overtravel member 244 rides up the ramp 248 to the advanced position shown in FIG. 7, the spine engaging portion 256 of the overtravel member extends above the associated spine engaging portion 258 of the spine latching member 240.

As the caddy 50 is driven into the player, the front edge thereof advances the overtravel member 244 to the location depicted in FIG. 7. The coil springs 148 and 150 urge the respective latching members 240 and 142 into engagement with the spine 52. The protruding spine engaging portion 256 of the caddy overtravel member 244, however, prevents the spine latching member 240 from capturing the spine 52 until the perpendicularly disposed edge 174 of the cutout 76 passes the normal latch up point formed by the right angle edge 260 of the spine latching member 240 and clears the perpendicularly disposed edge 262 of the overtravel member occupying the advanced position. The rigid coupling rod 246 precludes the other spine latching member 142 from hooking up the spine 52 until the first spine latching member 240 is allowed to latch up. When the caddy 50 clears the back cliff 262 of the overtravel member 244, the coil springs 148 and 150 snap the associated spine latching members 240 and 142 into the respective cutouts 76 and 78 to lock the spine 52 in place. As the jacket 54 is withdrawn from the player, the leaf springs 170 and 172 drive the spine 52 out until the perpendicularly disposed edges 174 and 176 of the cutouts 76 and 78 are accurately located by the associated edges 260 and 180 of the respective spine latching members 240 and 142 in the manner indicated in FIG. 8. To prevent the caddy overtravel member 244 from interfering with the registration of the spine 52 in the player, it is important that the back cliff 262 of the overtravel member does not protrude beyond the back cliff 260 of the spine latching member 240 when the overtravel member is retracted. When the jacket 52 is removed, the coil springs 152 and 154 cause the spine releasing members 124 and 126 to drop until the tabs 156 and 158 reengage the respective spine latching members 240 and 142.

Figures 8, 9:
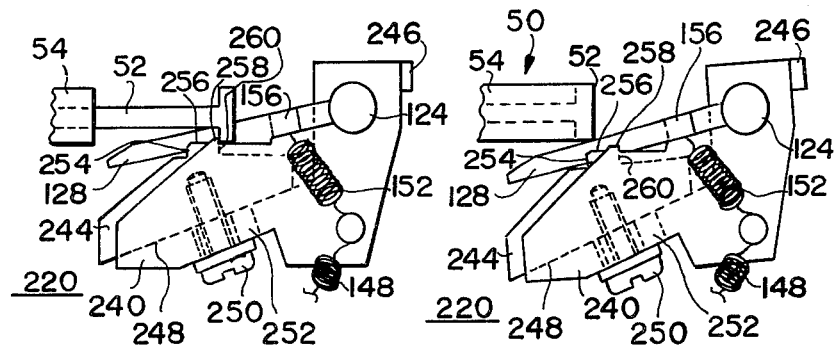

To retrieve the record, an empty sleeve 54 is reinserted into the player. The leading edge of the caddy sleeve 54 engages the deflected spine releasing members 124 and 126 and further rotates them out of the way. As this happens, the tabs 156 and 158 disposed on the corresponding spine releasing members 124 and 126 press against the respective spine latching members 240 and 142 to drive them out of the cutouts 76 and 78 in the spine 52 to free it. When the spine 52 is freed, the stiff leaf springs 170 and 172 push the released spine into the sleeve 54 to snap it in place. The loaded caddy 50 can then be retrieved from the player as can be seen in FIG. 9.

To prevent non-simultaneous delatching of the spine 52, the spine engaging portion 256 and the back edge 262 of the overtravel member 244 are arranged not to protrude beyond the corresponding surfaces 258 and 260 of the spine latching member 240 when the caddy overtravel member is retracted.

The spacing between the perpendicularly disposed edge 260 of the spine latching member 240 and the back edge 262 of the caddy overtravel member 244 when the caddy 50 has arrived at the normal latch up point, shown in FIG. 7, exceeds any tolerance buildup to assure simultaneous latch up of both sides of the spine 52 when the caddy is fully inserted into the player to prevent possible damage to the disc. The normal latch up point is defined as the point along the caddy insertion path where the spine latching members 142 and 240 would have normally captured the spine 52 to lock it to the player in the absence of the caddy overtravel member 244. Alternatively, the normal latch up point can be defined as the point where the perpendicularly disposed edges 174 and 176 of the cutouts 76 and 78 in the spine 52 are aligned with the corresponding edges 180 and 260 of the spine latching members 142 and 240.

Another embodiment 320 of the invention is illustrated in FIGS. 10 and 11. In the therein-shown embodiment, an overtravel member 340 is pivotally mounted within a slot provided in one of the spine latching members identified by numeral 342. The two spine latching members 342 and 142 are coupled together by a rigid coupling rod 344. The operation of the record extraction mechanism 320 is similar to that of the record extraction mechanism 220.

The modification of the caddy extraction mechanism 120 in accordance with the present invention effectively avoids a potential failure mode caused by a non-simultaneous latching of the spine.

What is claimed is:

1. In a disc record player for use with a record caddy consisting of an outer jacket and an inner record retaining spine; said player having a record extraction mechanism including a pair of spaced apart spine latching members for capturing said spine during insertion of said caddy into said player so that said spine and an associated record remain inside said player when said jacket is withdrawn; improvement comprising means cooperating with one of said spine latching members for preventing said one spine latching member from capturing said spine until the other spine latching member is ready to capture said spine.

2. In a disc record player for use with a record caddy consisting of an outer jacket and an inner record retaining spine; said player having a record extraction mechanism including a pair of spaced apart spine latching members for capturing said spine during insertion of said caddy into said player so that said spine and an associated record remain inside said player when said jacket is withdrawn; latch overtravel means comprising:

(A) a moveably mounted member mounted on one of said spine latching members for motion between a retracted position and an advanced positon; wherein said caddy engages said moveably mounted member during said caddy insertion to drive it toward said advanced position thereof; said moveably mounted member having a spine engaging portion which extends beyond the spine engaging portion of said one spine latching member when said moveably mounted member is advanced to prevent said one spine latching member from capturing said spine until both of said spine latching members are ready to hook said spine to said player; and (B) a member coupling said spine latching members together to prevent the other spine latching member from capturing said spine until both of said spine latching members are in position to capture said spine for retention in said player upon jacket withdrawal.

3. The disc record player as defined in claim 2 wherein said latch overtravel means further includes means for biasing said moveably mounted member toward said retracted position thereof; said caddy engaging said moveably mounted member during said caddy insertion to push it toward said advanced position thereof.

4. The disc record player set forth in claim 2 wherein said moveably mounted member is provided with an edge disposed substantially perpendicular to the caddy insertion path such that the leading edge of said caddy engages said perpendicularly disposed edge to positively advance said moveably mounted member during said caddy insertion.

5. The disc record player as defined in claim 2 wherein said movably mounted member is slidably mounted on a ramp provided on said one spine latching member for motion between said retracted position and said advanced position; wherein said spine engaging portion of said movably mounted member does not protrude beyond said spine engaging portion of said one spine latching member when said moveably mounted member is retracted to prevent said moveably mounted member from interfering with delatching of said spine during record retrieval.

6. The disc record player of claim 2 wherein said moveably mounted member is pivotally mounted on said one spine latching member for motion between said retracted position and said advanced position; wherein said spine engaging portion of said moveably mounted member does not protrude beyond said spine engaging portion of said one spine latching member when said moveably mounted member is retracted to prevent said moveably mounted member from interfering wiht unlatching of said spine during record retrieval.

7. The disc record player defined in claim 2 wherein each of said spine engaging portions of said moveably mounted member and said one spine latching member are each equipped with a perpendicularly disposed surfaces; wherein said perpendicularly disposed surface of said moveably mounted member is disposed beyond said perpendicularly disposed surface of said one spine latching member when said moveably mounted member is advanced to prevent said one spine latching member from latching up said spine until said spine clears said perpendicularly disposed surface of said moveably mounted member.

8. The disc record player set forth in claim 7 wherein said perpendicularly disposed surface of said moveably mounted member does·not protrude beyond said perpendicularly disposed surface of said one spine latching member when said moveably mounted member is retracted to prevent said moveably mounted member from interfering with unlatching of said spine during record retrieval.

* * * * *